US008654737B2

(12) United States Patent
Shi et al.

(10) Patent No.: US 8,654,737 B2
(45) Date of Patent: Feb. 18, 2014

(54) METHODS AND SYSTEMS USING FAST CONNECTION SETUP PROCEDURE FOR WIMAX NETWORKS (75) Inventors: Guangming Carl Shi, San Diego, CA (US); Kuo-Chun Lee, San Diego, CA (US); Tom Chin, San Diego, CA (US); Steven Cheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 682 days.

(21) Appl. No.: 12/358,706

(22) Filed: Jan. 23, 2009

(65) Prior Publication Data

US 2010/0189020 A1 Jul. 29, 2010

(51) Int. Cl.
*H04W 4/00* (2009.01)
(52) U.S. Cl.
USPC .......................................................... 370/331
(58) Field of Classification Search
None
See application file for complete search history.

(56) References Cited

U.S. PATENT DOCUMENTS

| 7,603,147 | B2* | 10/2009 | Son et al. | 455/574 |
| 2003/0114204 | A1* | 6/2003 | Allen et al. | 455/574 |
| 2005/0243059 | A1* | 11/2005 | Morris et al. | 345/158 |
| 2005/0254462 | A1 | 11/2005 | Gopal | |
| 2008/0274729 | A1* | 11/2008 | Kim et al. | 455/423 |
| 2009/0052361 | A1* | 2/2009 | Cai et al. | 370/311 |
| 2010/0220641 | A1* | 9/2010 | Son et al. | 370/311 |

OTHER PUBLICATIONS

International Search Report and Written Opinion—PCT/US10/021892, International Search Authority—European Patent Office, May 6, 2010.
Taiwan Search Report—TW099101836—TIPO—Feb. 26, 2013.

* cited by examiner

*Primary Examiner* — Raj Jain
(74) *Attorney, Agent, or Firm* — Tyler J. Overall (57) ABSTRACT Techniques for an MS to establish one or more default service flows, after entering a WiMAX network are provided. The techniques presented herein may enable the MS to maintain said one or more default service flows during the sleep mode. The one or more default service flow may be utilized in quickly establishing a connection between a WiMAX BS and the MS following the sleep mode.

32 Claims, 7 Drawing Sheets

METHODS AND SYSTEMS USING FAST CONNECTION SETUP PROCEDURE FOR WIMAX NETWORKS

TECHNICAL FIELD

Certain embodiments of the present disclosure generally relate to wireless communication and, more particularly, to connection setup procedures when leaving a sleep mode.

SUMMARY

Certain embodiments provide a method for exchanging data by a mobile station (MS), in a wireless network. The method generally includes negotiating a default service flow, entering a sleep mode, deactivating the sleep mode in response to detecting a user-initiated data demand, and modifying the default service flow to accommodate the user initiated data demand.

Certain embodiments provide an apparatus for exchanging data by a mobile station (MS), in a wireless network. The apparatus generally includes logic for negotiating a default service flow, logic for entering a sleep mode, logic for deactivating the sleep mode in response to detecting a user-initiated data demand, and logic for modifying the default service flow to accommodate the user initiated data demand.

Certain embodiments provide an apparatus for exchanging data by a mobile station (MS), in a wireless network. The apparatus generally includes means for negotiating a default service flow, means for entering a sleep mode, means for deactivating the sleep mode in response to detecting a user-initiated data demand, and means for modifying the default service flow to accommodate the user initiated data demand.

Certain embodiments provide a computer-program product for exchanging data by a mobile station (MS) in a wireless network, comprising a computer readable medium having instructions stored thereon, the instructions being executable by one or more processors. The instructions generally include instructions for negotiating a default service flow, instructions for entering a sleep mode, instructions for deactivating the sleep mode in response to detecting a user-initiated data demand, and instructions for modifying the default service flow to accommodate the user initiated data demand.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Mobile WiMAX standards define an idle mode during which a mobile station (MS) may power down components in an effort to conserve power. In the idle mode, the MS powers up components to monitor for page messages in recurring MS Paging Listening ("listening") intervals, while powering down components in MS Paging Unavailable ("sleep") intervals.

During initialization, a WiMAX MS may perform network entry procedures, including ranging, subscriber capability negotiations, authentication, and registration. After entering the network, the MS may set up a service flow or enter the idle mode. Traditionally, if there is no data demand, the MS may promptly enter the idle mode to save power.

However, when exiting the idle mode the MS may encounter unnecessary delay while the MS re-enters the network and establishes a service flow.

Certain embodiments of the present disclosure may provide a procedure for an MS to establish one or more default service flows, after entering a WiMAX network. Additionally, embodiments may enable the MS to maintain said one or more default service flows during the sleep mode. The one or more default service flow may be utilized in quickly establishing a connection between a WiMAX BS and the MS following the sleep mode.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
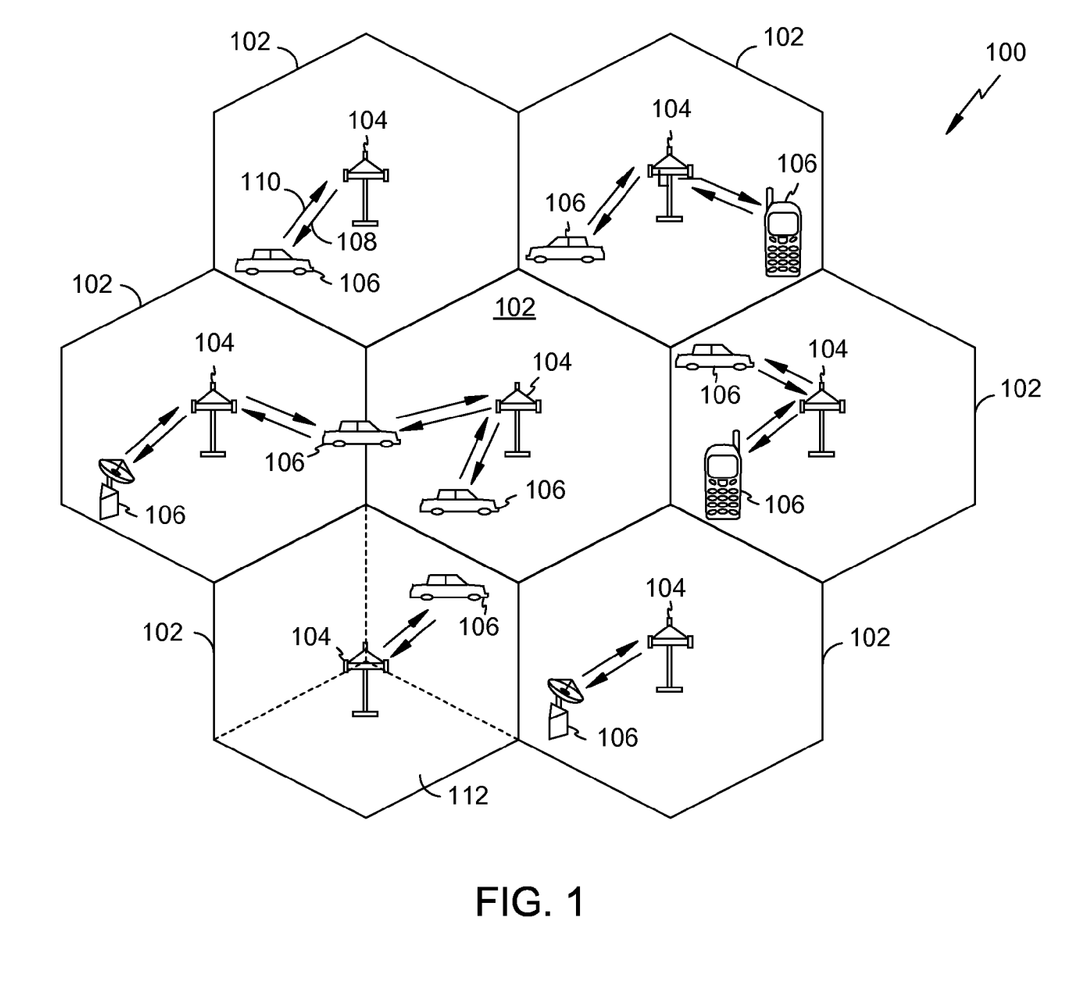
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
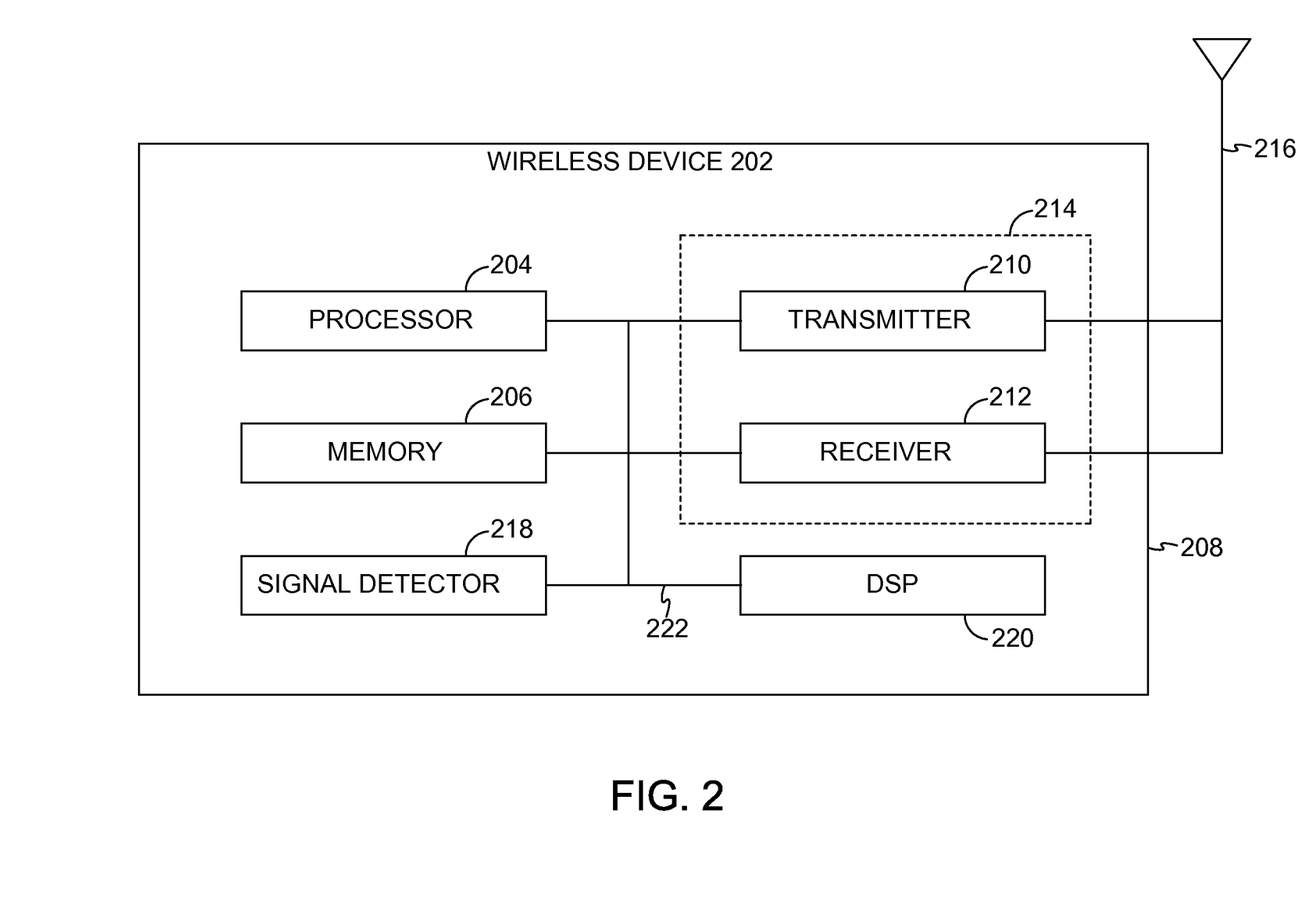
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
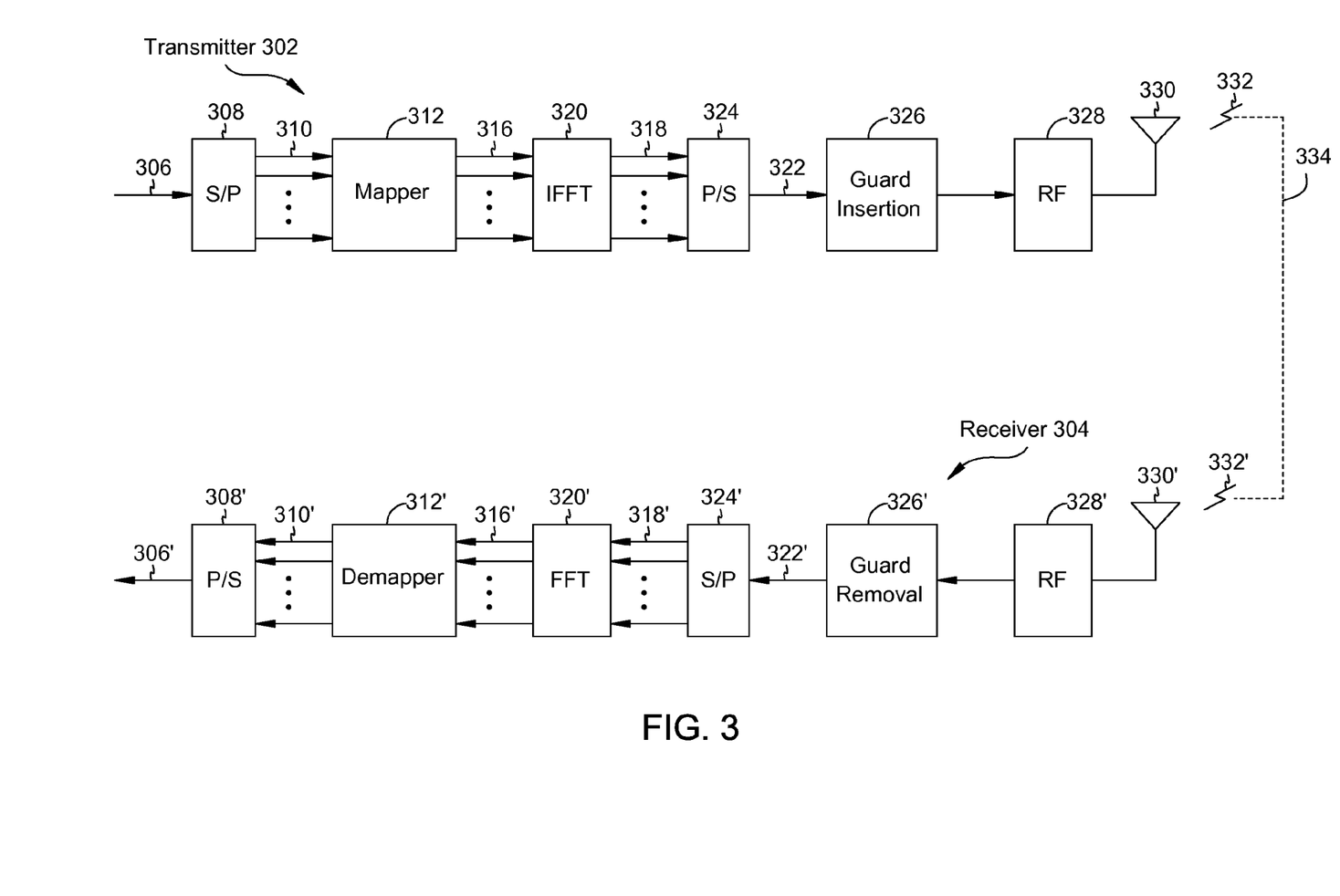
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Fast Connection Setup with Low Battery Power Consumption for WiMAX

An MS may enter a WiMAX network after performing a set of initialization procedures. The initialization procedures may include ranging, subscriber capability negotiations, authentication, and registration. After entering the network, the MS may set up a service flow or enter an idle mode. If there are actual data demands, the MS may set up one or more service flows and begin exchanging data with a WiMAX BS. In contrast, if there are no data demands, the MS may promptly enter the idle mode.

However, if the MS enters an idle mode and data demands later arise, the BS may need to send a page broadcast message (MOB_PAG-ADV) to the MS. Additionally, the MS may need to re-enter the network before establishing a new service flow. In short, the conventional way of entering the idle mode in the absence of data demands may require unnecessary processing and longer delays in exchanging data after leaving the idle mode.

By establishing a default service flow, embodiments of the present disclosure may reduce unnecessary delay and processing used to re-enter the network and establish a service flow after an idle mode by establishing a default service flow with the MS prior to entering the sleep mode and maintaining the default service flow while in the sleep mode.

Figure 4:
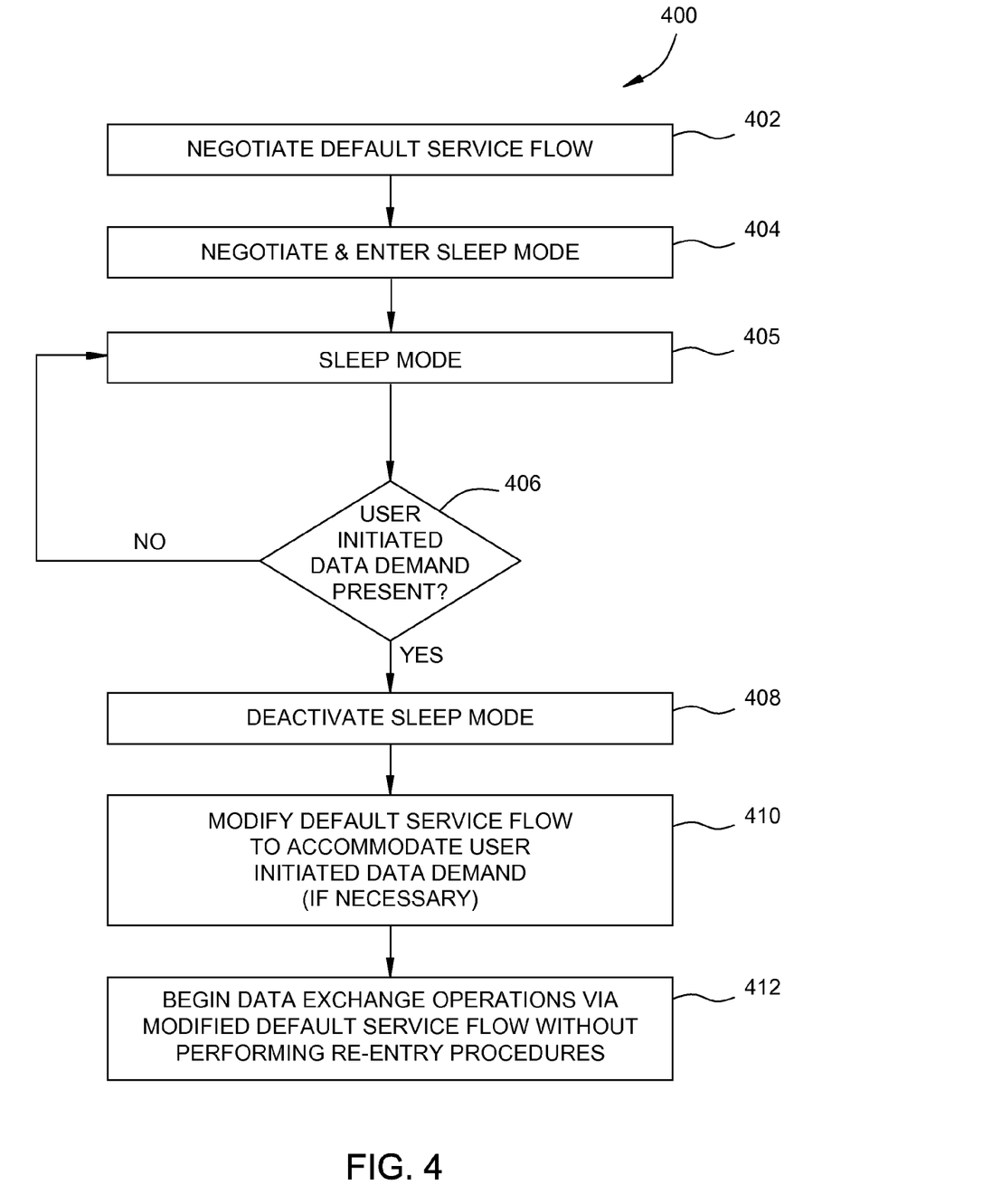
FIG. 4 illustrates example operations for entering and exiting a sleep mode.

FIG. 4 illustrates example operations 400 for quickly setting up a connection following a sleep mode, in accordance with certain embodiments of the present disclosure.

Operations begin, after the MS has entered and registered with the network via the previously described entry procedures, with the MS negotiating a minimum set of default service flows with the BS, at 402. For example, the MS may be configured to establish a minimum set of one default service flow with a best effort (BE) quality of service (QoS). However, in certain embodiments, the MS may be configured to establish a minimum set of service flows with a QoS likely to be utilized by the MS in the future.

Additionally, in some instances, the MS may have data demands after entering the network. In such instances, the MS may establish one or more user initiated service flows instead of one or more default service flows.

In order to avoid reserving resources for the one or more default service flows, the MS may employ a provisioned QoS parameter set or an admitted QoS parameter set.

The provisioned QoS parameter set may result in the BS assigning a service flow ID (SFID) to the one or more default service flows. However, system resources may not be allocated to the one or more default service flows, nor may data packets be associated with the one or more default service flows.

The admitted QoS parameter set may result in the BS assigning a service flow ID (SFID) and connection ID (CID) to the one or more default service flows. However, the admitted QoS parameters may prevent bandwidth resources from being allocated to the one or more default service flows and may prevent data packets being associated with the one or more default service flows.

At 404, after successfully establishing one or more default service flows, the MS may negotiate and enter the sleep mode. In certain embodiments, this may be done by exchanging sleep request (MOB_SLP-REQ) and sleep response (MOB_SLP-RSP) messages with the BS.

Depending on the QoS associated with the default service flow previously established, the MS may request the BS to activate one or more power saving class (PSC) IDs. For example, if the default service flow is supported by a non real-time variable rate (nrt-VR) or best effort (BE) QoS, the MS may request the BS to activate a PSC of type 1. In contrast, if the default service flow is supported by an unsolicited grant service (UGS), a real-time variable rate (rt-VR), or an extended real-time variable rate (ert-VR) QoS, the MS may request the BS to activate a PSC of type 2. Additionally, if the default service flow is supported by a multicast service, the MS may request the BS activate a PSC of type 3.

At 406, the MS may determine if a user initiated data demand is present. If there is not a user initiated data demand present, the MS may continue in the sleep mode 405, in accordance with the negotiated PSC. Note, the determination of the presence of user initiated data may be an ongoing procedure which spans both sleep and available windows of the sleep mode.

However, if a user initiated data demand (i.e., a data demand originating from the MS) is present, the MS may deactivate sleep mode, as illustrated at 408. In certain embodiments, the MS may deactivate sleep mode by exchanging MOB_SLP-REQ and MOB_SLP-RSP messages with the BS.

Note, that if a data demand arises on the BS side of the network, the MS may be notified during an available window, in accordance with conventional sleep mode operations, by receiving a MOB_SLP-RSP message.

In certain embodiments, the MS may also deactivate sleep mode by transmitting data packets during the available window of the sleep mode. For example, the MS may transmit a dynamic service flow related MAC management message (e.g., a service flow change (DSC) message).

After deactivating the sleep mode, the MS may, if necessary, modify the default service flow to accommodate the user initiated data demand, at 410. For example, the MS may use a DSC message to change the provisioned service flow or the admitted service flow to an active service flow. Additionally, the MS may use the DSC message to change the QoS parameters from the provisioned QoS parameter set or the admitted QoS parameter set to the active QoS parameter set.

One embodiment of a DSC message may be a service flow addition (DSA) message. The DSA message may be used to add one or more additional service flows to the one or more default service flows.

Similarly, the BS may send a DSC message to the MS to change the provisioned service flow to an admitted or active service flow. To change, or modify, a service flow without a connection CID, the BS may map the SFID to a CID and notify the MS of the change to the service flow in a service flow change request (DSC-REQ). In contrast, if the MS requested the DSC, the BS may implement the change and notify the MS of the change to the service flow in a service flow change response (DSC-RSP).

After modifying the one or more default service flows to accommodate the user initiated data demands, the MS, at 412, may begin data exchange operations via the modified default service flow without performing network re-entry procedures.

Note that after all the user initiated service flows are released, the MS may maintain the one or more default service flows, as previously described, to reduce unnecessary delay in establishing future user initiated connections.

Figure 5:
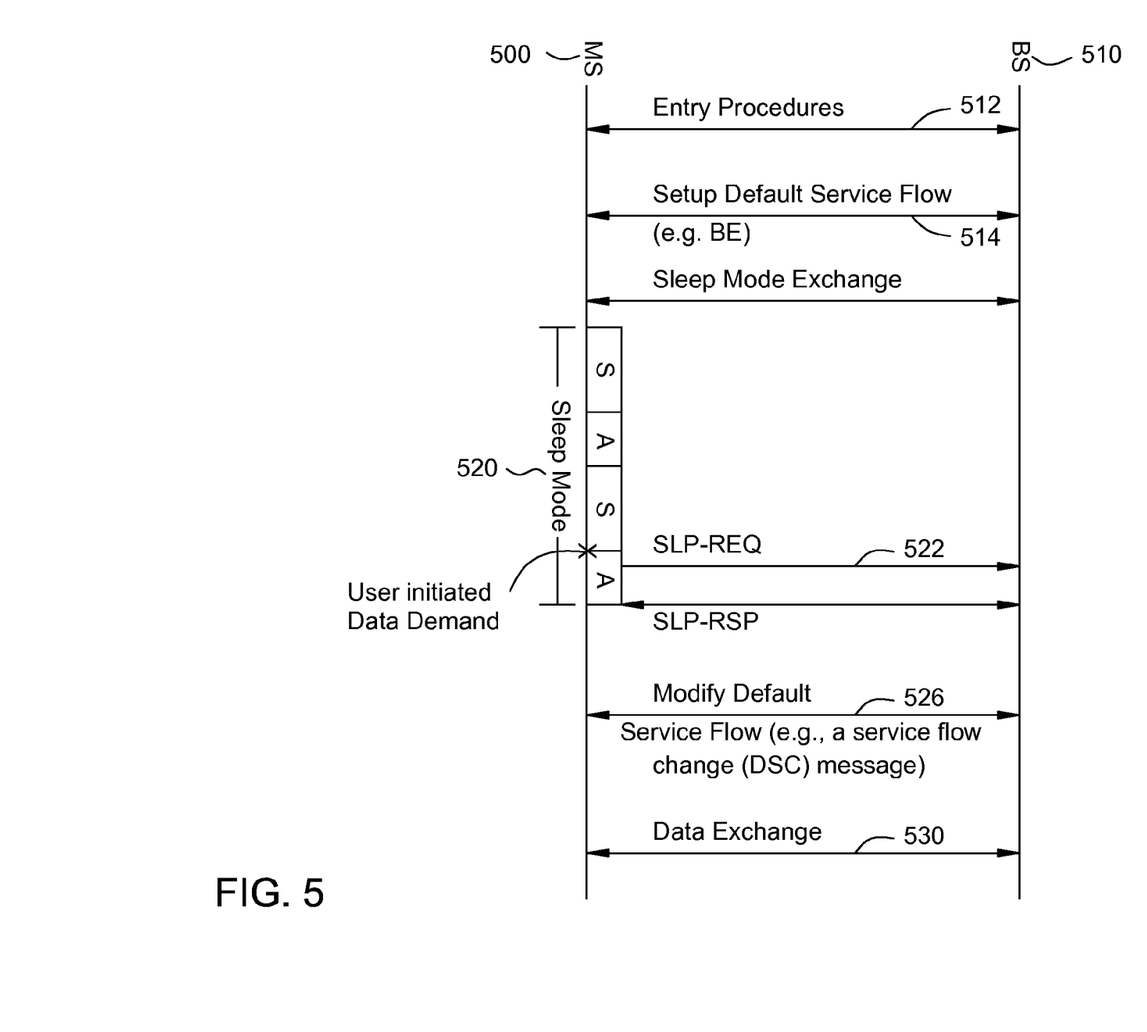
FIG. 5 illustrates example exchanges between a BS and an MS, when exiting a sleep mode.

FIG. 5 illustrates an example exchange between a WiMAX BS 510 and an MS 500 entering and exiting a sleep mode, in accordance with embodiments of the present disclosure. As previously described, the MS may engage in entry procedures 512 when entering the WiMAX network. The entry procedures 512 may include ranging, subscriber capability negotiations, authentication, and registration.

The MS 500 may then establish one or more default service flows 514, prior to negotiating and entering the sleep mode 520. At some point during the sleep mode 520, a user initiated data demand may surface. In response to the user initiated data demand, the MS 500 may deactivate the sleep mode by sending a MOB_SLP-REQ 522. After receiving acknowledgement from the BS 510, the MS 500 may modify the default service flow 526, if necessary, before exchanging data 530 with the BS 510, in accordance with the user initiated data demand.

Figure 6:
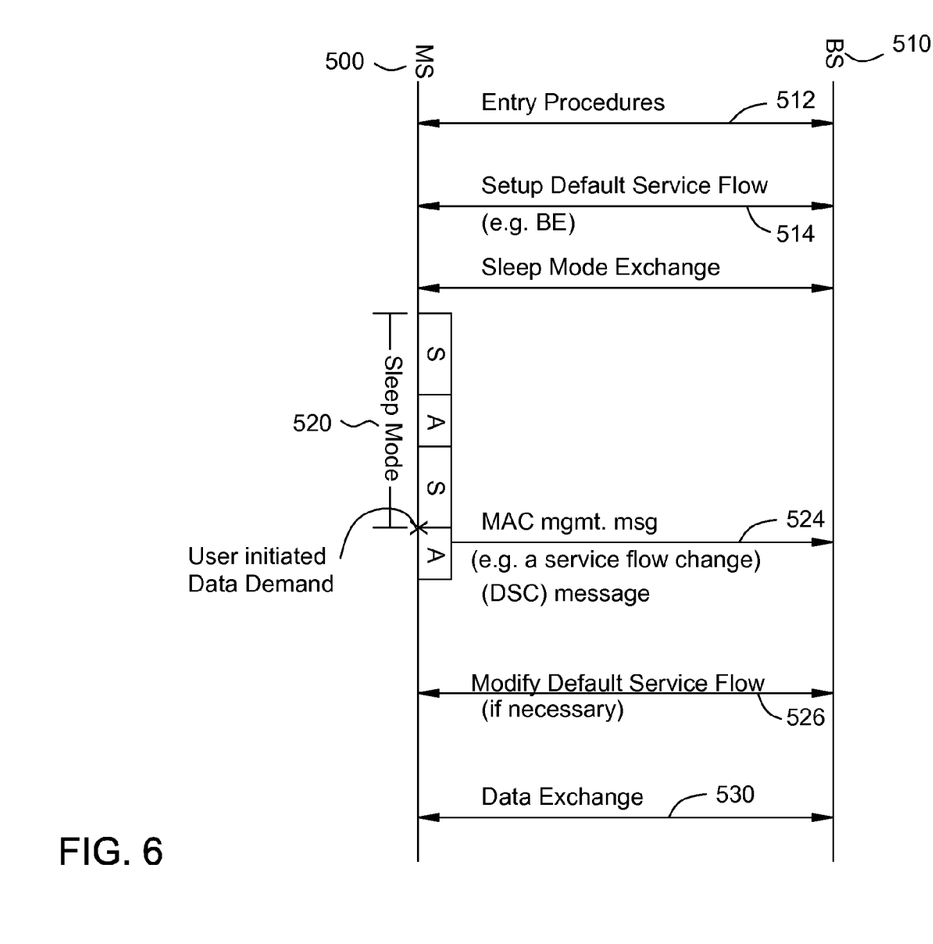
FIG. 6 illustrates example exchanges between a BS and an MS, when exiting a sleep mode.

FIG. 6 illustrates an example exchange in which the MS 500 may deactivate the sleep mode 520 by sending a MAC management message 524 during an available window of the sleep mode 520. For example, the MS may send a DSC message to the BS modifying the default service flow. Accordingly, the MS 500 may not need to modify the default service flow 526 separately after deactivating the sleep mode 520.

Figure 4A:
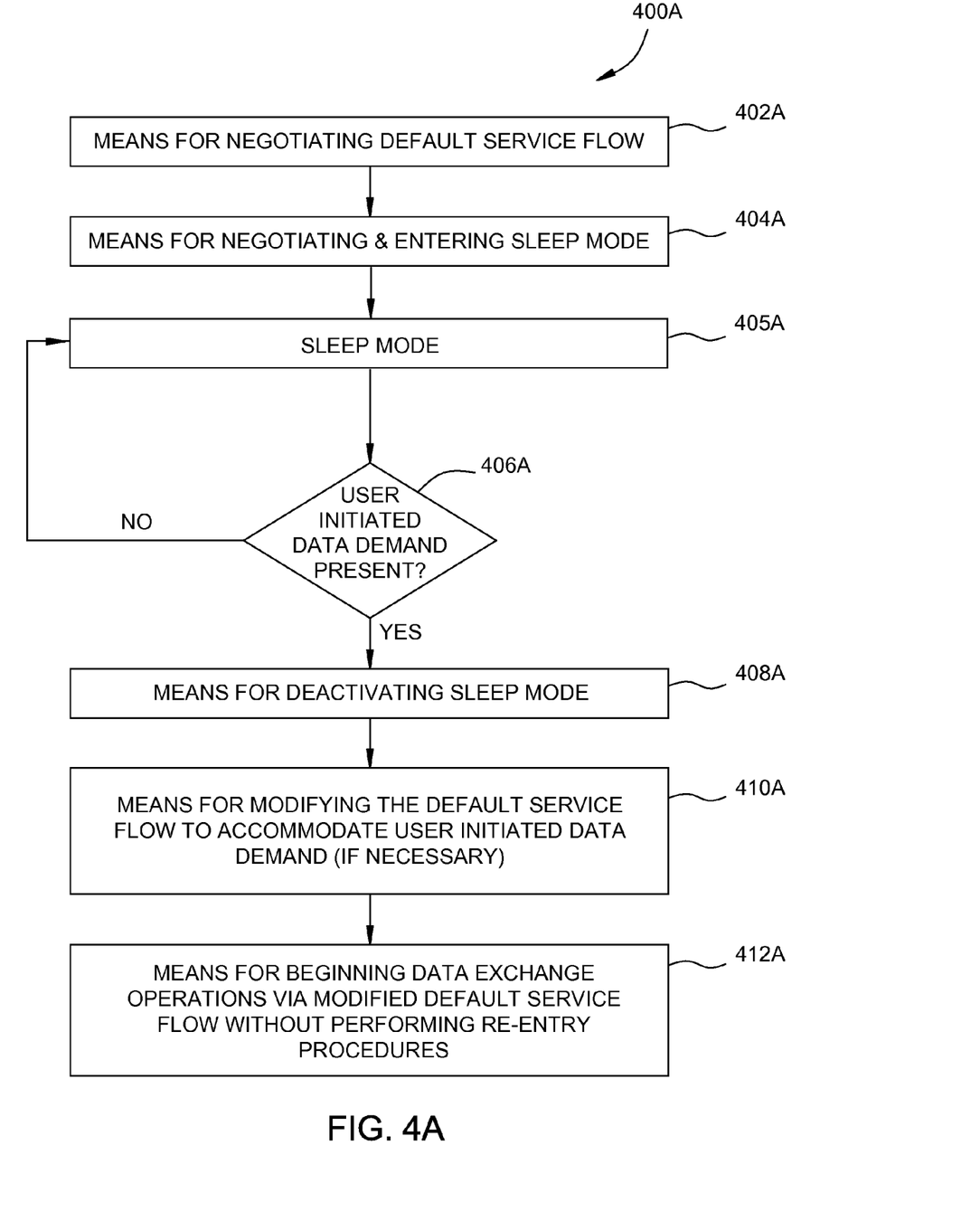
FIG. 4A is a block diagram of components capable of performing the example operations shown in FIG. 4.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 402-412 illustrated in FIG. 4 correspond to means-plus-function blocks 402A-412A illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to certain embodiments of the present disclosure, other and further embodiments may be devised without departing from the basic scope thereof, and the scope thereof is determined by the claims that follow.

What is claimed is:

1. A method for exchanging data by a mobile station (MS) in a wireless network, comprising:
negotiating a default service flow;
requesting that a power saving class type associated with the default service flow be activated from among different power saving class types;
entering a sleep mode directly in response to negotiating the default service flow and in accordance with the requested power saving class type, in which resources are allocated to the default service flow during the sleep mode, wherein the sleep mode is entered through an exchange of sleep request and sleep response messages;
deactivating the sleep mode in response to detecting a user-initiated data demand; and
modifying the default service flow to accommodate the user initiated data demand.

2. The method of claim 1, wherein negotiating a default service flow comprises sending a provisioned Quality of Service (QoS) parameter set.

3. The method of claim 1, wherein negotiating a default service flow comprises sending an admitted Quality of Service (QoS) parameter set.

4. The method of claim 1, wherein modifying the default service flow comprises sending a service flow change (DSC) message.

5. The method of claim 1, wherein deactivating the sleep mode comprises sending a MAC management message.

6. The method of claim 5, wherein the MAC management message comprises a service flow change (DSC) message.

7. The method of claim 1, wherein deactivating the sleep mode comprises sending a mobile sleep request (MOB_SLP-REQ).

8. The method of claim 1, wherein modifying the default service flow comprises:
changing the default service flow to an active service flow; and
maintaining the default service flow after the active service flow is released.

9. An apparatus for exchanging data by a mobile station (MS) in a wireless network, comprising:
a memory; and
at least one processor coupled to the memory, the at least one processor being configured:
to negotiate a default service flow;
to request that a power saving class type associated with the default service flow be activated from among different power saving class types;
to enter a sleep mode directly in response to the negotiation of the default service flow and in accordance with the requested power saving class type, in which resources are allocated to the default service flow during the sleep mode, wherein the at least one processor is configured to enter the sleep mode through an exchange of sleep request and sleep response messages;
to deactivate the sleep mode in response to detecting a user-initiated data demand; and
to modify the default service flow to accommodate the user initiated data demand.

10. The apparatus of claim 9, wherein the at least one processor is configured to negotiate the default service flow by sending a provisioned Quality of Service (QoS) parameter set.

11. The apparatus of claim 9, wherein the at least one processor is configured to negotiate the default service flow by sending an admitted Quality of Service (QoS) parameter set.

12. The apparatus of claim 9, wherein the at least one processor is configured to modify the default service flow by sending a service flow change (DSC) message.

13. The apparatus of claim 9, wherein the at least one processor is configured to deactivate the sleep mode by sending a MAC management message.

14. The apparatus of claim 12, wherein the MAC management message comprises a service flow change (DSC) message.

15. The apparatus of claim 9, wherein the at least one processor is configured to deactivate the sleep mode by sending a mobile sleep request (MOB_SLP-REQ).

16. The apparatus of claim 9, wherein the at least one processor is configured to:
change the default service flow to an active service flow; and
maintain the default service flow after the active service flow is released.

17. An apparatus for exchanging data by a mobile station (MS) in a wireless network, comprising:
means for negotiating a default service flow;
means for requesting that a power saving class type associated with the default service flow be activated from among different power saving class types;
means for entering a sleep mode directly in response to negotiating the default service flow and in accordance with the requested power saving class type, in which resources are allocated to the default service flow during the sleep mode, wherein the sleep mode is entered through an exchange of sleep request and sleep response messages;
means for deactivating the sleep mode in response to detecting a user-initiated data demand; and
means for modifying the default service flow to accommodate the user initiated data demand.

18. The apparatus of claim 17, wherein the means for negotiating a default service flow comprises means for sending a provisioned Quality of Service (QoS) parameter set.

19. The apparatus of claim 17, wherein the means for negotiating a default service flow comprises means for sending an admitted Quality of Service (QoS) parameter set.

20. The apparatus of claim 17, wherein the means for modifying the default service flow comprises means for sending a service flow change (DSC) message.

21. The apparatus of claim 17, wherein the means for deactivating the sleep mode comprises means for sending a MAC management message.

22. The apparatus of claim 21, wherein the MAC management message comprises a service flow change (DSC) message.

23. The apparatus of claim 17, wherein the means for deactivating the sleep mode comprises means for sending a mobile sleep request (MOB_SLP-REQ).

24. The apparatus of claim 17, wherein the means for modifying the default service flow comprises:
means for changing the default service flow to an active service flow; and
means for maintaining the default service flow after the active service flow is released.

25. A non-transitory computer readable storage medium for exchanging data by a mobile station (MS) in a wireless network, having instructions stored thereon, the instructions being executable by one or more processors and the instructions comprising:
instructions for negotiating a default service flow;
instructions for requesting that a power saving class type associated with the default service flow be activated from among different power saving class types;
instructions for entering a sleep mode directly in response to negotiating the default service flow and in accordance with the requested power saving class type, in which resources are allocated to the default service flow during the sleep mode, wherein the instructions for entering the sleep mode comprise instructions for exchanging sleep request and sleep response messages;
instructions for deactivating the sleep mode in response to detecting a user-initiated data demand; and
instructions for modifying the default service flow to accommodate the user initiated data demand.

26. The non-transitory computer-readable storage medium of claim 25, wherein the instructions for negotiating a default service flow comprise instructions for sending a provisioned Quality of Service (QoS) parameter set.

27. The non-transitory computer-readable storage medium of claim 25, wherein the instructions for negotiating a default service flow comprise instructions for sending an admitted Quality of Service (QoS) parameter set.

28. The non-transitory computer-readable storage medium of claim 25, wherein the instructions for modifying the default service flow comprise instructions for sending a service flow change (DSC) message.

29. The non-transitory computer-readable storage medium of claim 25, wherein the instructions for deactivating the sleep mode comprise instructions for sending a MAC management message.

30. The non-transitory computer-readable storage medium of claim 29, wherein the MAC management message comprises a service flow change (DSC) message.

31. The non-transitory computer-readable storage medium of claim 25, wherein the instructions for deactivating the sleep mode comprise instructions for sending a mobile sleep request (MOB_SLP-REQ).

32. The non-transitory computer-readable storage medium of claim 25, wherein the instructions for modifying the default service flow comprise:
instructions for changing the default service flow to an active service flow; and
instructions for maintaining the default service flow after the active service flow is released.

* * * * *